(12) United States Patent
Kato et al.

(10) Patent No.: US 7,811,546 B2
(45) Date of Patent: Oct. 12, 2010

(54) ALUMINUM HYDROXIDE AGGREGATED PARTICLES, PROCESS FOR PRODUCING THE SAME, VESSEL USED THEREFOR, AND PROCESS FOR PRODUCING ALUMINUM HYDROXIDE POWDER

(75) Inventors: Hisakatsu Kato, Niihama (JP); Masashi Wada, Niihama (JP); Naoyuki Eguchi, Niihama (JP); Hirofumi Sasaki, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 11/748,398

(22) Filed: May 14, 2007

(65) Prior Publication Data
US 2007/0217977 A1 Sep. 20, 2007

Related U.S. Application Data

(62) Division of application No. 10/289,429, filed on Nov. 7, 2002, now Pat. No. 7,704,465.

(30) Foreign Application Priority Data

Nov. 7, 2001 (JP) .............................. 2001-342358
Nov. 7, 2001 (JP) .............................. 2001-342359

(51) Int. Cl.
*C01F 7/14* (2006.01)
*B01J 8/10* (2006.01)
(52) U.S. Cl. ....................... 423/629; 422/215
(58) Field of Classification Search ................ 423/629, 423/625; 422/215
See application file for complete search history.

(56) References Cited

U.S. PATENT DOCUMENTS 4,049,773 A 9/1977 Mejdell et al.
(Continued)

FOREIGN PATENT DOCUMENTS

CN 1036756 A 11/1989
(Continued)

OTHER PUBLICATIONS

Y. Oda et al., Chemical Abstracts, vol. 113, No. 2, (Jul. 1990), Abstract No. 9045, "Aluminum hydroxide for artificial marble, and its manufacture", p. 154, XP000191510.
(Continued)

*Primary Examiner*—Stanley Silverman
*Assistant Examiner*—James Fiorito
(74) *Attorney, Agent, or Firm*—Birch, Stewart, Kolasch & Birch, LLP

(57) ABSTRACT

Aluminum hydroxide aggregated particles which have an average particle diameter of not less than 40 μm, an average particle diameter as determined after pressing at 1,000 kg/cm² of not more than 35 μm, and an L value of slurry obtained by mixing 20 ml of glycerol and 10 g of the aluminum hydroxide aggregated particles of not more than 69, are obtained by a process comprising the steps of:
(a) feeding a supersaturated aqueous sodium aluminate solution to a vessel,
(b) adding aluminum hydroxide seeds to the supersaturated aqueous sodium aluminate solution,
(c) stirring the seed-added solution in the vessel while continuously feeding an additional supersaturated aqueous sodium aluminate solution into the vessel to hydrolyze the supersaturated aqueous sodium aluminate solution,
(d) separating the aluminum hydroxide aggregated particles from the aqueous sodium aluminate solution, and
(e) continuously discharging the aqueous sodium aluminate solution out of the vessel.

6 Claims, 2 Drawing Sheets

U.S. PATENT DOCUMENTS

| | | |
|---|---|---|
| 4,238,159 A | 12/1980 | Tielens et al. |
| 4,243,636 A | 1/1981 | Shiraki et al. |
| 4,364,919 A | 12/1982 | Yamada et al. |
| 4,483,624 A | 11/1984 | Bacon, Jr. et al. |
| 4,829,103 A | 5/1989 | Oda et al. |
| 5,098,669 A | 3/1992 | Kawanami et al. |
| 5,130,113 A | 7/1992 | Kitayama et al. |
| 6,028,127 A | 2/2000 | Yanagase et al. |
| 6,056,803 A | 5/2000 | Waite |
| 6,217,622 B1 | 4/2001 | Hiscox et al. |
| 6,508,583 B1 | 1/2003 | Shankwitz et al. |
| 2004/0136262 A1 | 7/2004 | Wilson |
| 2005/0007874 A1 | 1/2005 | Roszczenko et al. |

FOREIGN PATENT DOCUMENTS

| | | |
|---|---|---|
| EP | 0 465 703 A1 | 1/1992 |
| EP | 1132342 A2 | 9/2001 |
| JP | 61-192331 A | 8/1986 |
| JP | 63-23131 B2 | 5/1988 |

OTHER PUBLICATIONS

E.T. White et al., Chemical Abstracts Service, Accession No. 109:24768, "Effect of caustic concentration on the growth rate of aluminum hydroxide particles", XP00226661 (1988).

U.S. Office Action dated Aug. 24, 2009 issued in related U.S. Appl. No. 12/476,853.

ALUMINUM HYDROXIDE AGGREGATED PARTICLES, PROCESS FOR PRODUCING THE SAME, VESSEL USED THEREFOR, AND PROCESS FOR PRODUCING ALUMINUM HYDROXIDE POWDER

This application is a Divisional of application Ser. No. 10/289,429, filed on Nov. 7, 2002 now U.S. Pat. No. 7,704,465, the entire contents of which are hereby incorporated by reference and for which priority is claimed under 35 U.S.C. §120.

BACKGROUND OF THE INVENTION

This invention relates to a process for producing aluminum hydroxide powder which makes it possible to obtain a filler-containing resin composition having an improved transparency, aluminum hydroxide aggregated particles which are the material therefor, a process for producing the same, and a vessel used therefor.

Aluminum hydroxide powder is often used as a filler for resins, such as unsaturated polyester resin, in producing artificial marble and the like. When aluminum hydroxide powder is used as a filler for artificial marble and the like, the powder is required to be excellent in filling property for resins and, at the same time, not to impair the transparency of resulting resin composition.

As to an industrial process for producing aluminum hydroxide, there are hitherto been known a process which comprises hydrolyzing a supersaturated aqueous sodium aluminate solution in the presence of seeds. For example, JP 63-23131 B discloses a process which comprises connecting plural vessels in series, feeding a supersaturated aqueous sodium aluminate solution continuously to the first vessel, hydrolyzing the supersaturated aqueous sodium aluminate solution in the presence of seeds, and allowing hydrolysis to proceed while sending the solution successively to the second vessel and the third vessel, to obtain aluminum hydroxide.

However, even when the aluminum hydroxide obtained by the above-mentioned process is filled in resins, it has been impossible to obtain a resin composition having a sufficient transparency.

The object of this invention is to provide aluminum hydroxide aggregated particles which can be suitably used for producing aluminum hydroxide powder which can give a resin composition that shows a high transparency when filled in resins or the like, a process for producing the aggregated particles, a vessel used therefor, and a process for producing aluminum hydroxide powder which uses the aggregated particles.

Figure 1:
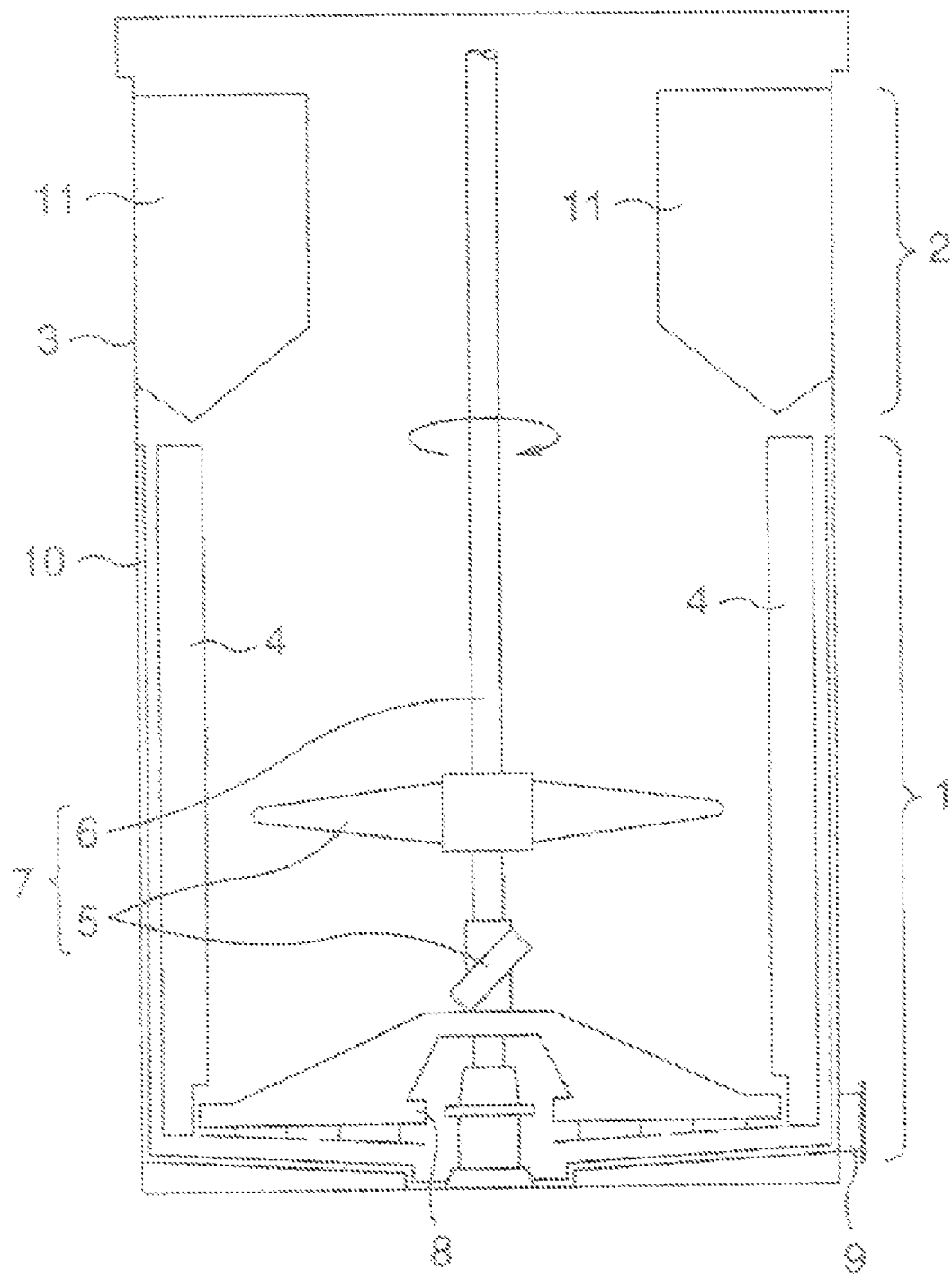
FIG. 1 is a schematic sectional view showing one embodiment of a vessel according to this invention.

The reference numerals in the Figures signify the following.

1 concentrating region, 2 clarifying region, 3 vessel, 4 baffle plate, 5 stirring blades, 6 rotating shaft, 7 stirrer, 8 sweeper, 9 offtake port, 10 anticorrosive material, 11 straightening vane

SUMMARY OF THE INVENTION

The present inventors have made extensive study to solve the above-mentioned problems, and resultantly completed this invention.

Thus, according to this invention, there are provided aluminum hydroxide aggregated particles, which have an average particle diameter of not less than 40 μm, an average particle diameter as determined after pressing at 1,000 kg/cm$^2$ of not more than 35 μm, and an L value of slurry obtained by mixing 20 ml of glycerol and 10 g of the aluminum hydroxide aggregated particles of not more than 69.

According to this invention, there is further provided a process for producing aluminum hydroxide aggregated particles comprising the steps of:
(a) feeding a supersaturated aqueous sodium aluminate solution to a vessel,
(b) adding aluminum hydroxide seeds to the supersaturated aqueous sodium aluminate solution to form a seed-added solution in the vessel,
(c) stirring the seed-added solution in the vessel while continuously feeding an additional supersaturated aqueous sodium aluminate solution into the vessel to hydrolyze the supersaturated aqueous sodium aluminate solution to obtain aluminum hydroxide aggregated particles and an aqueous sodium aluminate solution,
(d) separating the aluminum hydroxide aggregated particles from the aqueous sodium aluminate solution, and
(e) continuously discharging the aqueous sodium aluminate solution out of the vessel.

According to this invention, there is further provided a process for producing aluminum hydroxide powder which comprises disintegrating the aluminum hydroxide aggregated particles obtained as above.

According to this invention, there is further provided a vessel used for the above-mentioned process for producing aluminum hydroxide aggregated particles, this is, a vessel having a hollow space defined by a surrounding wall and a bottom part, wherein the vessel has:
a supply port at a lower portion of the wall,
two or more baffle plates mounted on an inner surface of the wall so that the baffle plates protrude toward the hollow space and extend in vertical direction along the inner surface of the wall from immediately above the bottom part to a prescribed height from the bottom part, and
a stirring blade located within the hollow space and within a space below the prescribed height of the baffle plates.

DETAILED DESCRIPTION OF THE INVENTION

The aluminum hydroxide aggregated particles (hereinafter referred to as "aggregated particles") of this invention have an average particle diameter of 40 μm, or more, preferably 50 μm or more, more preferably 60 μm or more, and has an average particle diameter, as determined after pressed at 1,000 kg/cm$^2$, of not more than 35 μm. The aggregated particles are each an assembly of at least 2, preferably 8 or more primary particles. For the aggregated particles, the average particle diameter determined after pressing is smaller than the average particle diameter before pressing, and the difference of average particle diameter before and after pressing is usually not less than 5 μm. The fact that the average particle diameter determined after pressing is smaller indicates that the cohesive force of the aggregated particle is weak and the particle is easily disintegrated to yield primary particles. The average particle diameter mentioned above can be determined with a laser scattering type particle distribution measuring apparatus.

In the aggregated particles of this invention, a slurry obtained by mixing 20 ml of glycerol and 10 g of aggregated particles shows an L value of not more than 69 in the Lab indication system specified by Commission International de l'Eclairage. Aggregated particles showing an L value higher than 69, even when they are disintegrated and filled in resins, cannot give a resin composition having a high transparency. The L value of aggregated particles is the smaller the better, and is, for example, preferably not more than 65, more preferably not more than 63.

The aggregated particles of this invention having characteristic properties shown above can be obtained, for example, by a process which comprises the steps of (a) feeding a supersaturated aqueous sodium aluminate solution to a vessel, (b) adding aluminum hydroxide seeds (hereinafter abbreviated as "seeds") to the supersaturated aqueous sodium aluminate solution to form a seed-added solution in the vessel, (c) stirring the seed-added solution in the vessel while continuously feeding an additional supersaturated aqueous sodium aluminate solution into the vessel, to hydrolyze the supersaturated aqueous sodium aluminate solution to obtain aggregated particles, (d) separating the aggregated particles from the aqueous sodium aluminate solution, and (e) continuously discharging the aqueous sodium aluminate solution out of the vessel.

In step (a), the supersaturated aqueous sodium aluminate solution fed into the vessel preferably has an effective $Na_2O$ (caustic $Na_2O$) concentration of about 120-180 g/l, an $Al_2O_3$ concentration of about 120-180 g/l and a molar ratio ($Na_2O/Al_2O_3$) of about 1.2-1.8. The term "effective $Na_2O$" refers to a value obtained by subtracting $Na_2CO_3$ content (in terms of $Na_2O$) from the total $Na_2O$ content in the aqueous sodium aluminate solution. The supersaturated aqueous sodium aluminate solution can be prepared, for example, by a method which comprises mixing bauxite with an aqueous sodium hydroxide solution, heating the resulting mixture at 120° C. or above to extract the alumina component in the bauxite, then subjecting the mixture to separation for example with a thickener, filtering the aqueous sodium aluminate solution thus obtained, and cooling the filtrate, or a method which comprises mixing aluminum hydroxide with sodium hydroxide, heating the mixture at 120° C. or above to dissolve aluminum hydroxide, subjecting the mixture to separation, e.g., filtration, and cooling the aqueous sodium aluminate solution thus obtained. The supersaturated aqueous sodium aluminate solution can also be prepared by a method which comprises mixing aluminum hydroxide with a saturated aqueous sodium aluminate solution after hydrolysis or an unsaturated aqueous sodium aluminate solution heating the mixture at 120° C. or above to dissolve aluminum hydroxide, followed by filtration, and cooling the aqueous sodium aluminate solution thus obtained.

The seeds added in step (b) preferably have an average particle diameter of about 1-2 µm. The seeds prepared by a method which comprises, without resorting to grinding, adding an acid aluminum salt, such as aluminum sulfate, to an aqueous sodium aluminate solution to cause hydrolysis are more preferable than those obtained by grinding coarse aluminum hydroxide. Addition of seeds can shorten the indication period which elapses till aluminum hydroxide is formed by hydrolysis of the supersaturated aqueous sodium aluminate, as well as control the particle diameter of aluminum hydroxide powder ultimately obtained. The amount of seeds can be appropriately determined according to the particle diameter of the intended aluminum hydroxide powder.

The stirring in step (c) is conducted, for example, by using a mechanical stirrer. The peripheral velocity of the stirring blade is preferably 0.1 m/s or more. The peripheral velocity is preferably not more than 5 m/s.

The separation in step (d) can be conducted, for example, by a method which utilizes specific gravity difference between the aggregated particles and the aqueous sodium aluminate solution. Through the separation, usually the aggregated particles move toward the lower part of the vessel and the aqueous sodium aluminate solution moves toward the upper part of the vessel, so that the aggregated particles sediment at the lower part of the vessel to give a slurry having a high solid concentration. The slurry has a concentration of solid (aggregated particles) of preferably 600 g/l or more, more preferably 700 g/l or more, and preferably not more than 1000 g/l, more preferably not more than 900 g/l.

In step (e), the aqueous sodium aluminate solution discharged out of the vessel preferably has an effective $Na_2O$ (caustic $Na_2O$) concentration of about 120-180 g/l, an $Al_2O_3$ concentration of about 60-80 g/l and a molar ratio ($Na_2O/Al_2O_3$) about 2-3.5

Figure 2:
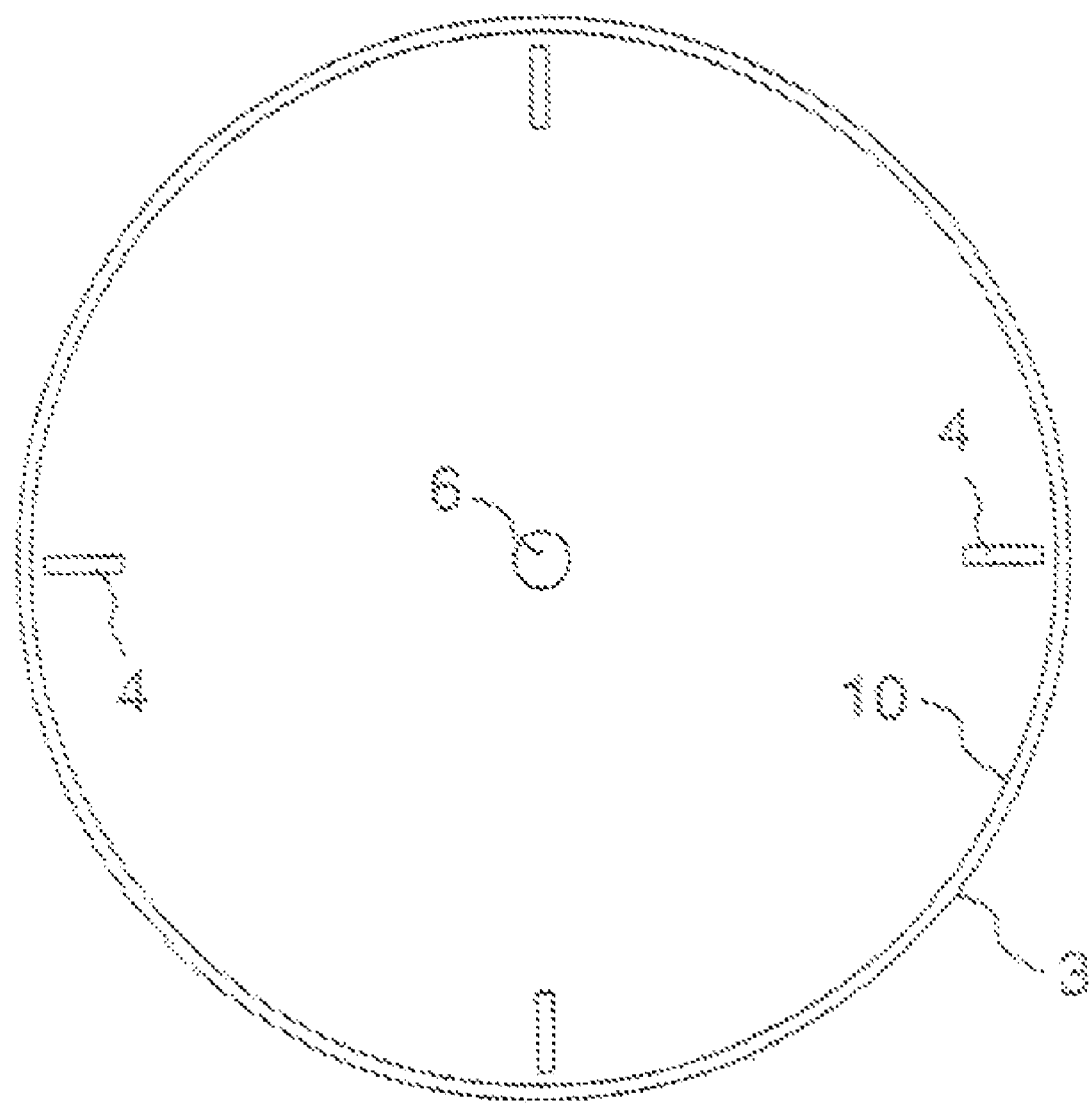
FIG. 2 is a schematic transverse sectional view of the vessel shown in FIG. 1.

The above-mentioned steps (a), (b), (c), (d) and (e) are preferably conducted in a single vessel. One example of the vessel used herein is shown in FIG. 1. The vessel 3 has at its lower part a supply port (not shown in the Figure) and baffle plates 4. The baffle plates 4, as shown in FIG. 2, protrude from the inner circumferential surface of the wall of vessel 3 and are provided in plurality (e.g., 2-10) at predetermined intervals in the peripheral direction of vessel 3. Each of the baffle plates 4 extrudes from immediately above the bottom part of vessel 3 long along the vertical direction (the direction of the rotating shaft) of vessel 3. By baffle plates 4 thus provided, stirring efficiency is improved and, at the time of stirring, an ascending current is formed along the inner surface of the wall of vessel 3, whereby the slurry in the concentrating region 1 specified by the height of baffle plates 4 can be brought to a substantially complete mixings state. As the result of the aqueous sodium aluminate solution being hydrolyzed in the concentrating region 1 at the complete mixing state, aggregated particles which have only a weak cohesive force and are easily disintegrated can be obtained. The reachable height of the ascending current is influenced by the height of baffle plates 4. The more the height of baffle plates 4 is increased, the higher point the ascending current reaches, and the concentrating region 1 increases in size. Usually the upper end of baffle plates 4 and the upper end of the concentrating region 1 are approximately at the same level. The height of baffle plates 4 is, relative to the total height of the vessel 3, preferably 50% or more, more preferably 70% or more, most preferably 75% or more, and preferably not more than 90%, and more preferably not more than 80%. Vessel 3 has a stirrer 7 which consists of a stirring blade 5 and a rotating shaft 6 which drives blade 5. Stirring blade 5 is, for example, a stirring vane and is provided in concentrating region 1. Rotating shaft 6 is usually provided at the center of the section, perpendicular to the longitudinal direction, of vessel 3. By the rotation of stirring blade 5, the slurry of concentrating region 1 is stirred. At the lower end part of rotating shaft 6, a sweeper 8 is provided. With the aid of sweeper 8, sedimentation of aggregated particles to the bottom part of vessel 3 can be prevented.

When the aggregated particles are produced by using vessel 3, in vessel 3 are formed a concentrating region 1 and, above concentrating region 1, a clarifying region 2. With vessel 3 along, in addition to the hydrolysis of the supersaturated aqueous sodium aluminate solution and the separation of the aggregated particles from the aqueous sodium aluminate solution, concentration of the aggregated particles can also be conducted.

The internal circumferential surface of the wall of vessel 3 below the height not higher than baffle plates 4 and the inner surface of the bottom part of the vessel are preferably lined with an anticorrosive material 10. The anticorrosive material used can be, for example, metallic materials, such as stainless steel, nickel, nickel alloy and titanium; inorganic materials, such as ceramics; and organic materials, such as fluororesins. The lining can be conducted, for example, by a method of flame-coating or baking the above-mentioned metallic materials or inorganic materials; by a method of welding or adhering a plate-formed metallic material having a thickness of 1 mm or more, preferably 2 mm or more, and not more than 10 mm, preferably not more than 3 mm; or by a method of adhering an organic material. With anticorrosive material 10 being thus lined, the corrosion of the internal surface of the wall of vessel 3 which is in contact with concentrating region 1 can be prevented and the coloring of aluminum hydroxide powder ultimately obtained can be decreased. For example, when 10 g of methyl methacrylate and 18 g of the aluminum hydroxide powder obtained are mixed, the resulting slurry shows a b value of not more than 3, preferably not more than 2, in the Lab indication system specified by Commission International de l'Eclairage. The smaller b value indicates the lower coloring.

On the inner circumferential surface of the wall of vessel 3 contacting with clarifying region 2 are provided in protrusion of a plurality (e.g., 2-8) of straightening vanes 11. These straightening vanes 11 play the role of promoting the separation of the aqueous sodium aluminate solution and the aggregated particles, formed by hydrolysis, from each other in concentrating region 1 and improving the clarity of the aqueous sodium aluminate solution. The number and the size of the straightening vane 11 are not particularly limited so long as the clarifying effect for the liquid is not impaired. Since the aggregated particles are substantially not present in clarifying region 2, the inner surface of vessel 3 contacting with clarifying region 2 needs not be lined with anticorrosive material 10. The aqueous sodium aluminate solution in clarifying region 2 is discharged from the discharge port (not shown in the Figure) provided at the upper part of vessel 3 to the outside of vessel 3.

In producing aluminum hydroxide powder by using the above-mentioned vessel, first a predetermined amount of a supersaturated aqueous sodium aluminate solution is fed into vessel 3 so that the content of the vessel can be stirred. Seeds are added to vessel 3, stirrer 7 is driven, then a supersaturated aqueous sodium aluminate solution is continuously fed to vessel 3 and, while the content is being stirred, the supersaturated aqueous sodium aluminate solution is hydrolyzed. When the feeding of the supersaturated aqueous sodium aluminate solution to vessel 3 is continued, the liquid level rises and reaches the upper end of baffle plate 4 and, when the feeding is further continued, reaches the discharge port provided at the upper part of the vessel 3. In vessel 3, as the result of separation, aggregated particles and an aqueous sodium aluminate solution are obtained. The solid (aggregated particles) concentration in concentrating region 1 increases gradually. On the other hand, the aqueous sodium aluminate solution is discharged from the discharge port provided at the upper part of vessel 3 to the outside of vessel 3. Thereafter, an operation which comprises feeding a supersaturated aqueous sodium aluminate solution from the lower part of vessel 3 and discharging the same amount of an aqueous sodium aluminate solution is conducted continuously. By this operation, the solid concentration in concentrating region 1 increases according to the amount of supersaturated aqueous sodium aluminate solution fed continuously. Through the above-mentioned series of operation, the temperature of vessel 3 is kept at 45° C. or above, preferably at 50° C. or above, and at 80° C. or below, preferably at 60° C. or below. At the time when the average particle diameter of aggregated particles has reached a predetermined value (for example 80 μm), the feeding of supersaturated aqueous sodium aluminate solution is discontinued, and the reaction mixture is kept for a predetermined time with stirring. At this time, the solid concentration of concentrating region 1 is preferably 600 g/l or more, more preferably 700 g/l or more, and preferably not more than 1,000 g/l, more preferably not more than 900 g/l. The time during which the supersaturated aqueous sodium aluminate solution is fed, though it varies depending on the intended particle diameter, is preferably not less than 500 hours and preferably not more than 1,000 hours. The aggregated particles in concentrating region 1 is taken out of offtake port 9 provided at the bottom of vessel 3, separated from liquid by centrifugation, filtration, or the like, and then washed according to necessity.

Then the aggregated particles are disintegrated to yield aluminum hydroxide powder. The disintegration is preferably conducted by a method which can break the bond between a primary particle and another primary particle without substantially destroying the primary particle themselves which constitute an aggregated particle, and preferably conducted, for example, with a kneader, blender, extruder, or the like. The aluminum hydroxide powder can be subjected, according to necessity, to drying or surface treatment. The aluminum hydroxide powder thus obtained has an average particle diameter of preferably not less than 10 μm and preferably not more than 35 μm, and can be suitably used as a filler for resins, such as unsaturated polyester resin, acrylic resin and epoxy resin.

EXAMPLE 1

Preparation of Aggregated Particles

A supersaturated aqueous sodium aluminate solution having a temperature of 58° C., a $Na_2O$ concentration of 125 g/l, an $Al_2O_3$ concentration of 125 g/l and a molar ratio of 1.65 was fed at a flow rate of 100 parts by weight/hour to vessel 3 having a structure shown in FIG. 1. The inner wall of the vessel 3 is provided with baffle plates 4 each having a height corresponding to 75% of the total height of vessel 3. When the liquid level of the supersaturated aqueous sodium aluminate solution reached the lower end of the upper stirring blade of blades 5 having two upper and lower stirring blades, rotation of stirrer 7 was started, and 150 parts by weight of seeds having an average particle diameter of 1.1 μm were added. While rotating stirrer 7 so that the peripheral velocity of stirring blades 5 might be 0.5 m/s, feeding of the supersaturated aqueous sodium aluminate solution to concentrating region 1 of vessel 3 was continued to allow hydrolysis to proceed in the concentrating region, and the aqueous sodium aluminate solution was discharged from the upper end of vessel 3. The discharged aqueous sodium aluminate solution had an $Na_2O$ concentration of 125 g/l, an $Al_2O_3$ concentration of 65 g/l and a molar ratio of 3.2. When the average particle diameter of aggregated particles in concentrating region 1 reached 80 μm, feeding of the supersaturated aqueous sodium aluminate solution was discontinued, and the reaction system was kept as it was. The solid concentration in concentrating region 1 at the time of discontinuing the feed was 800 g/l. After being kept, the content was withdrawn from offtake port 9 of vessel 3, subjected to solid-liquid separation using a centrifugal separator, and the resulting solid was washed to obtain the aggregated particles.

Evaluation of Aggregated Particles

The L value of a slurry obtained by mixing 10 g of the aggregated particles obtained above and 20 ml of glycerol was determined with a color-difference meter (Type A-300, a trade name, mfd. by Nippon Denshoku Kogyo K.K.). The result obtained is shown in Table 1. Separately, 5 g of the above-mentioned aggregated particles were placed in a cylindrical die 20 mm in diameter and pressed under a pressure of 1,000 kg/cm$^2$ for 1 minute, the resulting pellets were pulverized with hands and a roller rod, and then the average particle diameter of the resulting powder was determined. The result obtained is shown in Table 2. The term "rate of change" in Table 2 indicates the decrease of average particle diameter observed after pressing relative to the average particle diameter before pressing.

Preparation and Evaluation of Aluminum Hydroxide Powder

The aggregated particles obtained above were disintegrated by using a blender and then dried to obtain aluminum hydroxide powder. Filling the aluminum hydroxide powder in an unsaturated polyester resin gave an artificial marble excellent in transparency.

Comparative Example 1

To the first vessel of an apparatus comprising 8 vessels, each equipped with a stirrer, connected in series was fed continuously a supersaturated aqueous sodium aluminate solution having a temperature of 58° C., an Na$_2$O concentration of 125 g/l, an Al$_2$O$_3$ concentration of 121 g/l and a molar ratio of 1.7 at a flow rate of 100 parts by weight/hour. In the vessel, part of aqueous sodium aluminate solution was hydrolyzed to obtain (aluminum hydroxide) aggregated particles. The aqueous sodium aluminate solution containing aggregated particles was transferred to the second vessel to allow hydrolysis to continue. Succeedingly, the aqueous sodium aluminate solution was hydrolyzed at the third to eight vessel, to obtain aggregated particles. The aqueous sodium aluminate solution discharged from the eighth vessel had a molar ratio of 3.3. The aggregated particles obtained were evaluated under the same conditions as in "evaluation of aggregated particles" described in Example 1. The results thus obtained are shown in Tables 1 and 2.

TABLE 1

|  | L value |
| --- | --- |
| Example 1 | 63 |
| Comparative Example 1 | 70 |

TABLE 2

|  | Average particle diameter (μm) | | Rate of change (%) |
| --- | --- | --- | --- |
|  | Before pressing | After pressing |  |
| Example 1 | 68 | 30 | 55.9 |
| Comparative Example 1 | 56 | 44 | 21.4 |

The aggregated particles obtained above were treated in the same manner as in "preparation and evaluation of aluminum hydroxide powder" described in Example 1. The artificial marble thus obtained did not have a sufficient transparency.

EXAMPLE 2

Preparation of Aluminum Hydroxide Powder

Aluminum hydroxide powder was obtained by repeating the same procedures as in Example 1 except that there was used a vessel lined as an anticorrosive material with a SUS 304 stainless steel sheet 2 mm in thickness welded to the inner surface of the vessel ranging from the bottom of the vessel to the upper end of the baffle plate, and that feeding of supersaturated aqueous sodium aluminate solution was discontinued at the time when the average particle diameter of aggregated particles in concentrating region 1 reached 40 μm.

Evaluation of Aluminum Hydroxide Powder

The b value of a slurry obtained by mixing 18 g of the powder obtained above and 10 g of methyl methacrylate was determined with a color-difference meter (Z-1001 DP, a trade name, mfd. by Nippon Denshoku Kogyo K.K.). The results thus obtained are shown in Table 3.

EXAMPLE 3

Aluminum hydroxide powder was obtained by repeating the same procedures as in "preparation of aluminum hydroxide powder" described in Example 2 except that no stainless steel sheet lining was applied to the vessel. The aluminum hydroxide powder thus obtained was evaluated under the same conditions as in "evaluation of aluminum hydroxide powder" described in Example 2. The results obtained are shown in Table 3.

TABLE 3

|  | Average particle diameter (μm) | b value |
| --- | --- | --- |
| Example 2 | 29 | 1.5 |
| Example 3 | 27 | 3.3 |

According to the aluminum hydroxide aggregated particles and the process for producing the same according to this invention, aluminum hydroxide aggregated particles are obtained which are the material for producing aluminum hydroxide powder which in turn can provide, when filled in a resin, a resin composition having a high transparency. The process for producing aluminum hydroxide powder according to this invention is a process which uses the above-mentioned aluminum hydroxide aggregated particles, and according to the process, the aluminum hydroxide powder can be easily obtained. Further, the use of the vessel according to this invention makes it possible to produce the aluminum hydroxide aggregated particles in a simple and easy manner.

What is claimed is:

1. A process for producing aluminum hydroxide aggregated particles of a filler for resins, comprising the steps of:
    (a) feeding a supersaturated aqueous sodium aluminate solution to a vessel,
    (b) adding aluminum hydroxide seeds to the supersaturated aqueous sodium aluminate solution to form a seed-added solution in the vessel,
    (c) stirring the seed-added solution in the vessel while continuously feeding an additional supersaturated aqueous sodium aluminate solution into the vessel to hydrolyze the supersaturated aqueous sodium aluminate solution to obtain aluminum hydroxide aggregated particles and an aqueous sodium aluminate solution, wherein the stirring is conducted with a mechanical stirrer having a stirring blade rotating at a peripheral velocity of not less than 0.1 m/s, (d) separating the aluminum hydroxide aggregated particles from the aqueous sodium aluminate solution, and (e) continuously discharging the aqueous sodium aluminate solution out of the vessel, wherein said vessel is a vessel for bringing a slurry composed an aqueous solution and aggregated particles to a substantially complete mixing state, having a hollow space defined by a surrounding wall and a bottom part, wherein the vessel has:

a supply port at a lower portion of the wall, two or more baffle plates mounted on an inner surface of the wall so that the baffle plates protrude toward the hollow space and extend in vertical direction along the inner surface of the wall from immediately above the bottom part to a prescribed height from the bottom part, and a stirring blade located within the hollow space and within a space below the prescribed height of the baffle plates; and straightening vanes;

wherein the baffle plates improve stirring efficiency, such that at the time of stirring, an ascending current is formed along the inner surface of the wall of vessel, whereby a slurry in a concentrating region specified by the height of baffle plates can be brought to a substantially complete mixing state, and wherein the straightening vanes are provided on the inner surface of the wall, so that the straightening vanes protrude toward the hollow space and are located on the wall above the baffle plates, and the straightening vanes promote separation of an aqueous solution and aggregated particles from each other in the concentrating region and improve the clarity of the aqueous solution.

2. The process according to claim 1, wherein the supersaturated aqueous sodium aluminate solution in steps (a) and (c) has an effective $Na_2O$ concentration of 120-180 g/l, an $Al_2O_3$ concentration of 120-180 g/l and a molar ratio ($Na_2O/Al_2O_3$) of 1.2-1.8.

3. The process according to claim 1, wherein the aluminum hydroxide seeds added in step (b) have an average particle diameter of 1-2 μm.

4. The process according to claim 1, wherein the hydrolysis in step (c) is conducted at 45-80° C.

5. The process according to claim 1, wherein the separation in step (d) is conducted until the aluminum hydroxide aggregated particles are concentrated to a concentration of 600 g/l or more.

6. The process according to claim 1, wherein the aqueous sodium aluminate solution discharged out of the vessel in step (e) has an effective $Na_2O$ concentration of 120-180 g/l, an $Al_2O_3$ concentration of 60-80 g/l and a molar ratio ($Na_2O/Al_2O_3$) of 2-3.5.

* * * * *